Dec. 15, 1925.  
L. C. HALDER  
VEHICLE SPRING  
Filed May 16, 1925
1,565,930
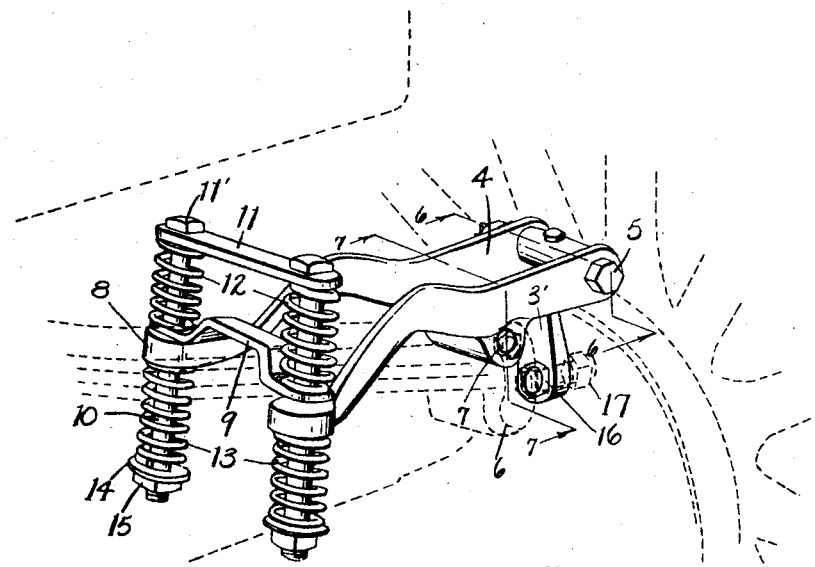
Fig. IV.
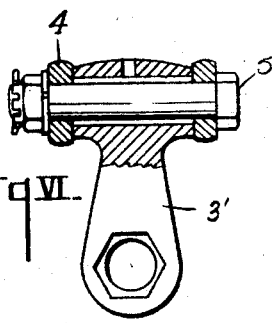
Fig. VI.
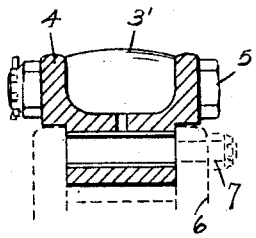
Fig. VII.
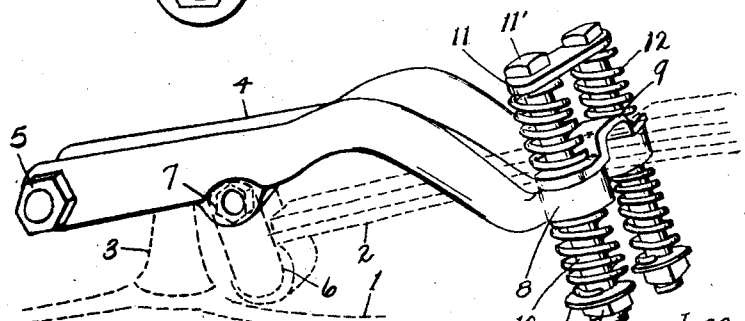
Fig. V.
Inventor  
Leo C. Halder  
By Chappell Earl  
Attorneys Patented Dec. 15, 1925.

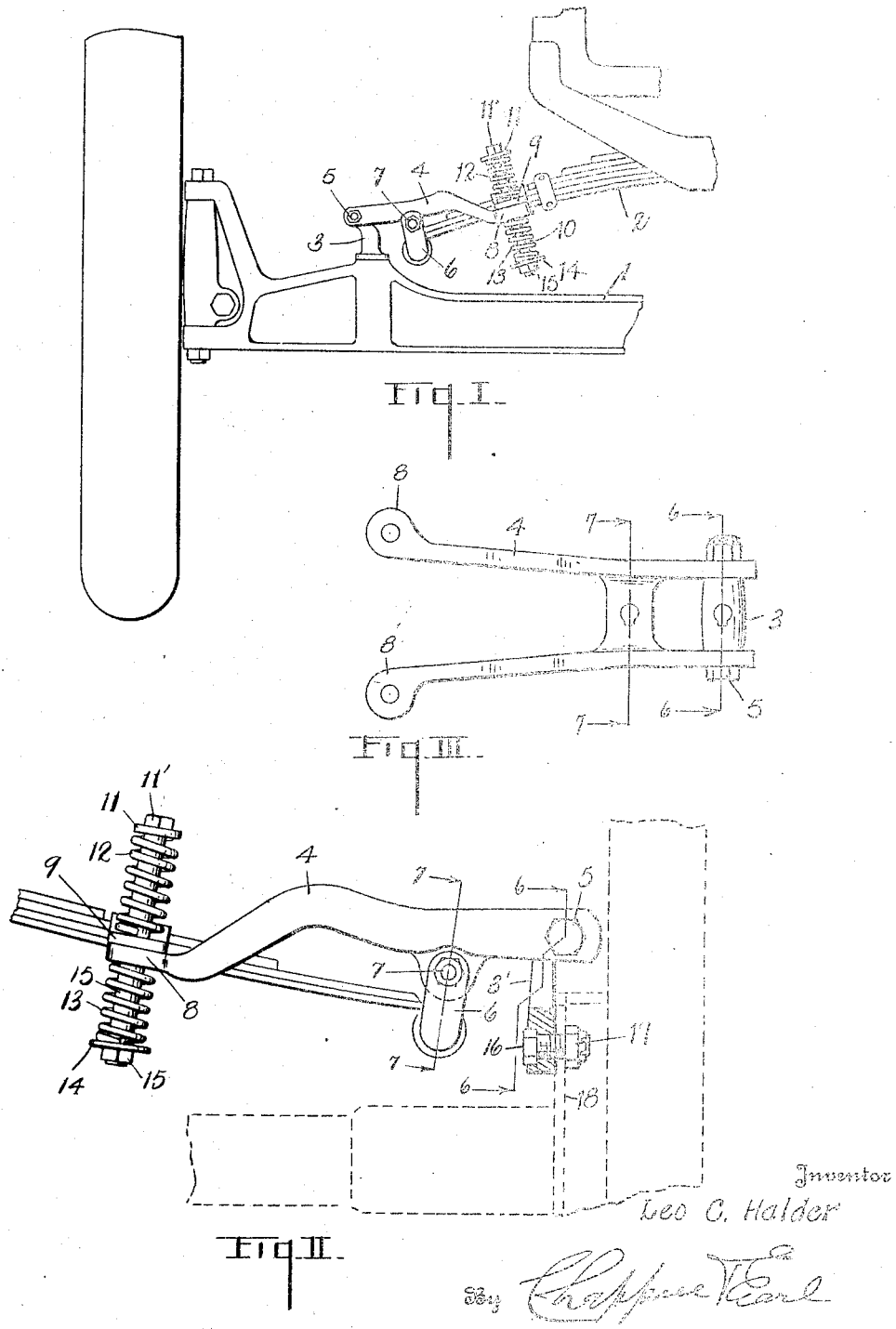

1,565,930

UNITED STATES PATENT OFFICE.

LEO C. HALDER, OF CERESCO, MICHIGAN, ASSIGNOR OF ONE-THIRD TO ANDREW WATSON LOCKTON, SR., OF BATTLE CREEK, MICHIGAN.

VEHICLE SPRING.

Application filed May 16, 1925. Serial No. 30,808.

*To all whom it may concern:*

Be it known that I, LEO C. HALDER, a citizen of the United States, residing at Ceresco, county of Calhoun, State of Michigan, have invented certain new and useful Improvements in Vehicle Springs, of which the following is a specification.

This invention relates to improvements in vehicle springs.

The main object of the invention is to provide an auxiliary attachment for a semielliptical leaf spring of a motor vehicle, such as a Ford, which increases resiliency and which also serves to a considerable degree as a shock absorber.

A further object is to provide such a structure having these advantages which may be applied as an attachment without change in the spring structure of the automobile and with very little adaptation otherwise, particularly in a Ford automobile as now put out by the manufacturer.

Objects pertaining to details and economies of construction and operation will appear from the detailed description to follow.

I accomplish the objects of the invention by the devices and means described in the specification. The invention is pointed out and defined in the claims. A structure which is a preferred embodiment of the invention is illustrated in the accompanying drawing, forming a part of this application, in which:

Fig. I is a detail elevation view of one of my improved spring structures as applied to the front spring and axle of a Ford automobile.

Fig. II is a similar detail view of the structure as applied to the rear spring and axle of such an automobile.

Fig. III is a plan view of the lever part of my improved spring attachment.

Fig. IV is a perspective view of my improved structure as applied to the rear spring and axle of such a vehicle, the parts of the vehicle and main spring being indicated by dotted lines.

Fig. V is a similar detail perspective view of the structure as applied to the front axle and spring, the axle, perch and main spring being indicated by dotted lines.

Fig. VI is an enlarged detail transverse sectional view taken on line 6—6 of Figs. II, III and IV, showing the detail of construction and connection of the perch to the brake flange of the rear axle.

Fig. VII is a detail sectional view taken on line 7—7 of Figs. II, III and IV, showing the connection of the main arm or lever part to the end of the main spring by the usual shackle.

In the drawing the sectional views are taken looking in the direction of the little arrows at the ends of the section lines and similar numerals of reference refer to similar parts throughout the several views.

The parts will be identified by their numbers. 1 is the main front axle. 2 is a half of one of the main semielliptical springs. 3 is the perch on the front axle. 4 is the bifurcated lever arm of my improved spring, pivotally connected at 5 to the perch and connected by the spring shackle 6 by pivot 7 at an intermediate point on the lever to the end of the main spring. The inner end of the arm is bifurcated at 8, 8. The yoke 9 is disposed above the same and is secured yieldingly to the bifurcated arms 8, 8 by the vertical bolts 10, one at each side. A pair of springs 12 are disposed above the yoke 9 on the bolts 10 and are retained in place at their upper ends by the cross arms 11 secured to the upper ends of the bolts 10 by the nuts 11'. A pair of coil springs 13 are disposed below the bifurcated arms 8, 8, and are retained in place by washers 14 and nuts 15.

The rear springs are similarly constructed except that the arms 4 are pivoted at 5 to perches 3' which are secured by bolts 16 and castellated nuts 17 (see Fig. II) to the brake flange 18 of the rear axle. It will thus be seen that the difference between the front and rear structure is merely in the matter of the design and arrangement of the perch. A perch somewhat longer than is used for connecting the usual semi-elliptical spring shackle projects above the brake flange on the rear axle to afford the connection. Comparatively long coil spring structures are usable in this way in a very compact relation. These coil springs yield very readily in advance of the action of the main spring. The yoke, which is upset and extends over and coacts with the top of the leaf spring, slides very readily on and permits very free movement of the bolts therethrough, which are kept in perfect alinement by the cross bar at the top. When the spring acts, the bifurcated arms compress the lower sections 10 of the spring, carrying the bolts down, and thus compressing also the upper sections 12 of the spring. This insures complete flexibility and permits the shock of a sudden jolt to be absorbed without its being transmitted to the main spring, and at the same time adds to the flexibility of the main spring, as will be readily understood from an inspection of the drawing. The compressed springs promptly return the main spring to normal after absorbing the jolt.

The arrangement I have illustrated is very compact and well adapted to the limited space in which it must be used. I desire to claim the invention specifically as illustrated and also broadly, as pointed out in the appended claims.

Having thus described my invention what I claim as new and desire to secure by Letters Patent is:

1. In a structure of the class described, the combination with the axle, of a perch carried thereby, a leaf body spring, a lever bifurcated at its inner end and pivoted at its outer end on the said perch and extending laterally at its inner end to each side of said body spring, vertical bolts disposed through the ends of the bifurcations, a yoke connecting the bolts together, offset to engage the top of said body spring, coiled springs disposed both above and below the said bifurcated arms on said bolts, a tie bar for the upper ends of said bolts, and a shackle connecting an intermediate part of the said arm to the end of said body spring, coacting as specified.

2. In a structure of the class described, the combination with the axle, of a perch carried thereby, a semi-elliptical body spring, a lever pivotally mounted on said perch suitably bifurcated and extending out laterally at each side of the said body spring, a vertical bolt disposed through the outer end of each bifurcated arm, a yoke for said bolt in proximity to the said bifurcated arm, a tie bar at the upper end of said bolts, and pairs of springs above the said yoke and below the said bifurcated arms, and a shackle link connecting the end of the body spring to an intermediate part of the lever, coacting as specified.

In witness whereof I have hereunto set my hand.

LEO C. HALDER.